Dec. 29, 1953   J. A. McNALLY   2,664,257
PNEUMATIC SUSPENSION SYSTEM
Original Filed April 29, 1949   3 Sheets-Sheet 1

*INVENTOR.*
JAMES A. McNALLY
BY George Sipkin
B. L. Zanguill
ATTORNEYS

Dec. 29, 1953  J. A. McNALLY  2,664,257
PNEUMATIC SUSPENSION SYSTEM
Original Filed April 29, 1949  3 Sheets-Sheet 2

INVENTOR.
JAMES A. McNALLY
BY George Sipkin
   B. L. Dangard
   ATTORNEYS

Dec. 29, 1953                J. A. McNALLY                2,664,257
                        PNEUMATIC SUSPENSION SYSTEM
Original Filed April 29, 1949                            3 Sheets-Sheet 3
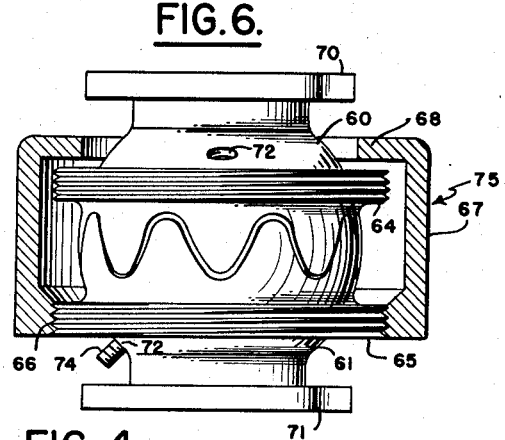
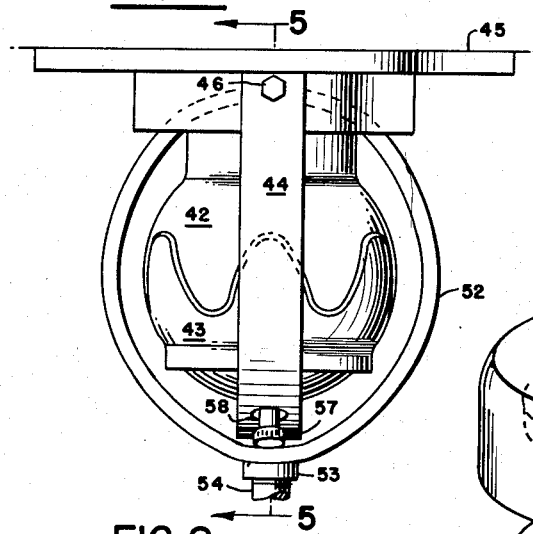
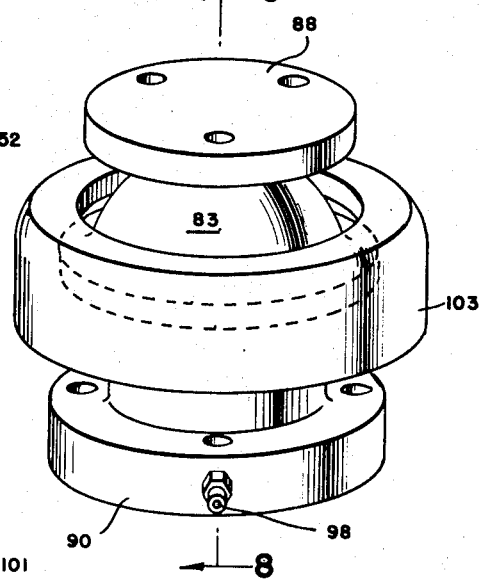
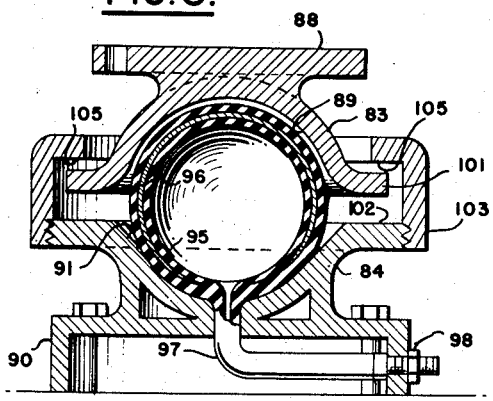
*INVENTOR.*
JAMES A. McNALLY
BY George Sipkin
B. L. Zangwill
ATTORNEYS

Patented Dec. 29, 1953

2,664,257

UNITED STATES PATENT OFFICE 2,664,257

PNEUMATIC SUSPENSION SYSTEM

James A. McNally, United States Navy, Arlington, Va.

Original application April 29, 1949, Serial No. 90,522. Divided and this application June 20, 1952, Serial No. 295,380

3 Claims. (Cl. 248—18)

(Granted under Title 35, U. S. Code (1952), sec. 266)

This application is a division of application Serial No. 90,522, filed April 29, 1949, for Pneumatic Suspension Systems.

The present invention relates to machine mounting systems and more particularly to pneumatic mounting systems which are subjected to severe shock loading.

Presently available machine mounting systems usually employ rubber or spring steel members to carry the weight of the machine and to isolate the machine from the supporting structure. However, such structures are in no way adjustable to adapt the mounting for changing conditions.

Mountings for mobile engines and especially those employed in combat vehicles are subjected to severe shocks which produce high inertia forces which must be transmitted to the supporting structure, and for the purposes of shock transmission the mounting must be extremely stiff. However, where it is desired to prevent the transmission of vibration through the mounting, the mounting must possess a lower natural vibration frequency than the vibration produced by the machine, which condition is produced by a very resilient mounting.

Furthermore, machine mountings in cramped conditions are difficult to align so as to produce the desired leveling of the machine because the machine must often be eccentrically positioned on its base.

The mounting of the present invention provides a soft mounting for isolating normal vibration of the engine by a plurality of individualized resilient bladders which are adapted to be inflated with a gas. The bladders are enclosed in separable metallic receptacle which limit the unrestrained movement of the bladder and transmit any shock loading through the metal receptacle. Since the individual light and resilience of the units may be changed by changing the pressure of the gas within the unit, mounting difficulties caused by an irregular foundation or unsymmetrical distribution of weight may be easily compensated for and corrected.

It is an object of the present invention to provide a machine mounting system in which the machine is pneumatically supported by a plurality of individualized inflatable elements.

It is a further object of the present invention to provide a resilient machine mounting system in which eccentric weight loading may be easily compensated for.

It is a still further object of the present invention to provide a resilient machine mounting which normal vibration of the machine is effectively isolated from the supporting structure and which also transmits shock forces satisfactorily.

Other objects and advantages of the present invention will be made more apparent by reference to the following description and to the annexed drawings in which:

Fig. 4 is a showing of a hanger mounting employing the present invention;

Fig. 6 is a mounting element similar to that shown in Fig. 4 except arranged for base mounting;

Fig. 7 is a showing of a modified mounting element in accordance with the present invention; and Fig. 8 is a section taken on line 8—8 of Fig. 7.

Figure 1:
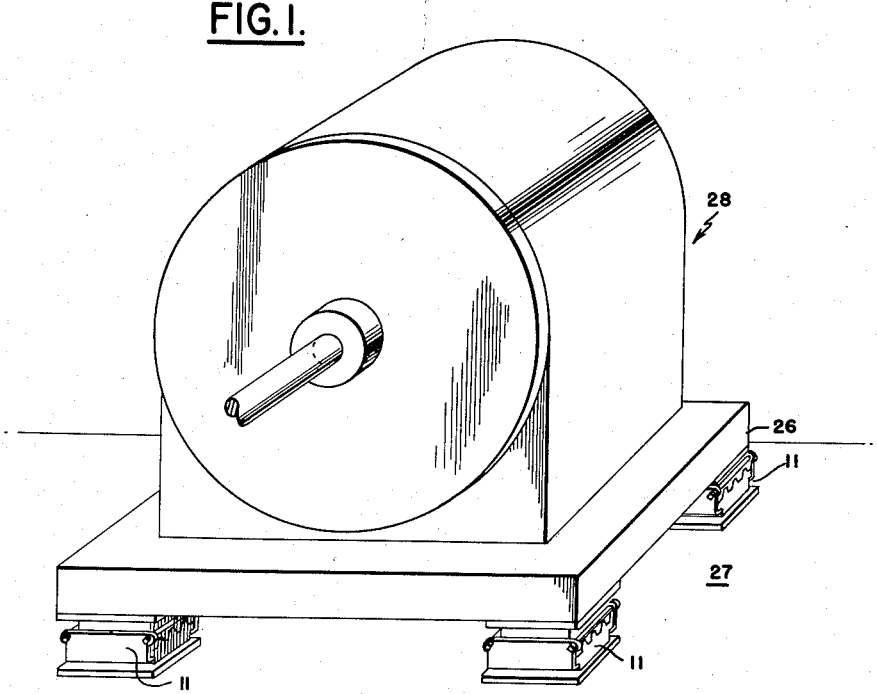
Fig. 1 is a showing of a machine mounted in accordance with the present invention.

Referring now to Fig. 1 the machine 28 is provided with a bed 26 and is supported on the foundation 27 by means of a plurality of individually inflatable elements 11 which are attached to the foundation and the machine bed. The weight of the machine 28 is supported by a plurality of resilient gas-filled bladders within the mounting elements 11, so that there is no metallic contact between the bed and the foundation under normal operating conditions and the vibration of the machine is effectively isolated from the foundation. The machine 28 may be readily adjusted to a level position by regulating the pressure in the individual elements 11 so that inequalities in weight loading among the several elements regardless of the cause may be compensated without dismantling the machine or even affecting its operation if the machine is in operation when the adjustment is made. It will be appreciated that the mounting unit under the heavier loading is inflated to a higher pressure and therefore exerts a larger restraining force on the machine. Stresses caused by the application of unequal vibrational loading in the base are substantially reduced because the weight distribution and the resilience of the support system are proportioned so as to cause the amplitude of the vibration to be the same at all parts of the base without creating bending stresses therein.

Figure 3:
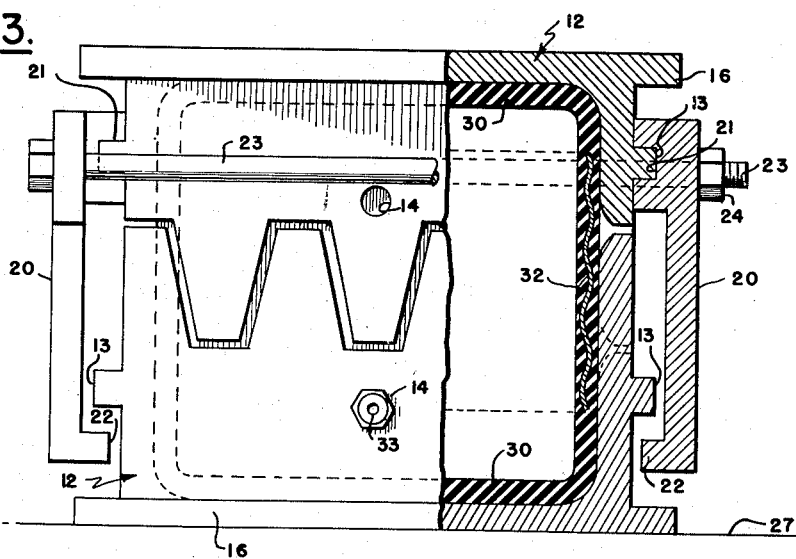
Fig. 3 is a side view, partly in section, of the mounting element shown in Fig. 1.
Figure 2:
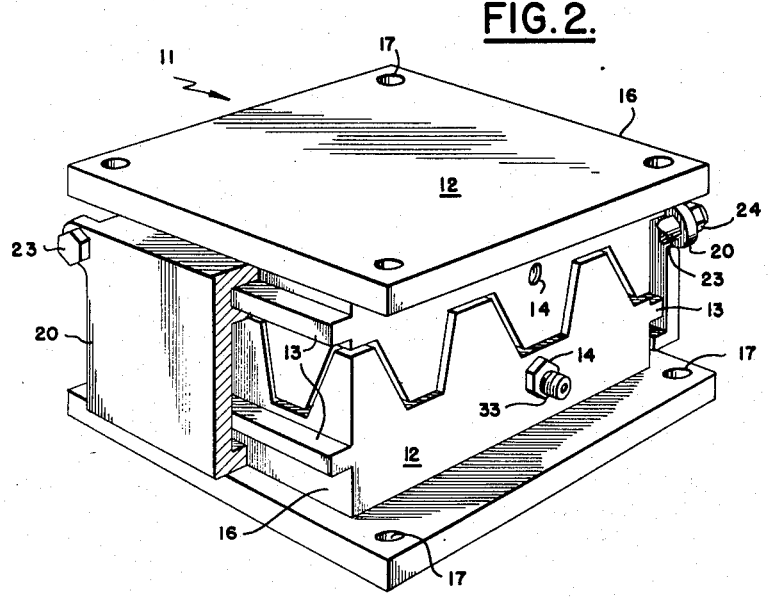
Fig. 2 shows a mounting element partly in section suitable for use in the present mounting system.

The mounting element 11 is shown in Figs. 2 and 3, to which reference is now made. Each mounting element 11 contains two similar receptacles 12, which receptacles are provided with upturned sides and may be of any convenient dimensions and shape, such as rectangular, cylindrical, or semi-ellipsoidal. The rectangular unit shown is intended to be illustrative, and the invention is not considered limited thereto. The upturned sides are slotted to provide a serrated edge such as a plurality of teeth which are adapted to intermesh with similar projections on a similar unit. The dimensions of the teeth and the slots illustrated in Fig. 1 are proportioned to provide substantial clearances between adjacent teeth to provide for lateral movement between two juxtapositioned receptacles. The teeth of each receptacle 12 are substantial duplicates and when such receptacles are mated with one another, the teeth intermesh thereby facilitating assembly and alignment of the units and erection of machines mounted thereon.

When two receptacles 12 are placed open side to open side, a cavity is formed between the two. A bladder 30 of resilient impervious material such as natural or artificial rubber molded to snugly fit the cavity thus formed is equipped with an inflating stem 33. The inflating stem 33 may be equipped with a check valve of the type usually employed in automobile tubes or any other suitable form, and a fabric or wire reinforcing strip 32 is molded into the bladder at the area of its surface corresponding to the area of the serrated edges on the cavity. The bladder 30 is inserted within the cavity and the stem 33 extends through the opening 14 in one of the receptacles 12. The opening 14 in the other receptacle 12 is not used, and the bladder 30 is reinforced at the point corresponding to the opening.

The receptacle 12 is provided with a base plate 16 containing a plurality of mounting holes 17 which is used to attach the mounting element 11 to the bed of the machine and to the foundation by means of bolts or screws. The attachment of the receptacles 12 should be separable from the foundation and the bed of the machine to facilitate inspection and repair of the unit, although welding or other permanent securing means may be employed for the purpose if desired.

The receptacles 12 are also equipped with longitudinal flanges 13 projecting from opposite outside surfaces, which flanges are engaged by the retaining plates 20 which serve to limit the separation of the receptacles to a safe value. The plates 20 which are attached to the mounting element 11 by means of bolts 23 and nuts 24 are provided with a longitudinal groove 21 which is adapted to receive the flange 13 of one receptacle and a projection 22 adapted to engage the flange 13 of the other receptacle at the limit of travel of one receptacle relative to the other, but entirely out of contact with the flange at all other times. A clearance is provided in the plate 20 to prevent mechanical contact between the plate 20 connected with one receptacle 12 and the other receptacle 12 except at the limit of travel, thereby preventing the transmission of vibration therebetween.

Figure 5:
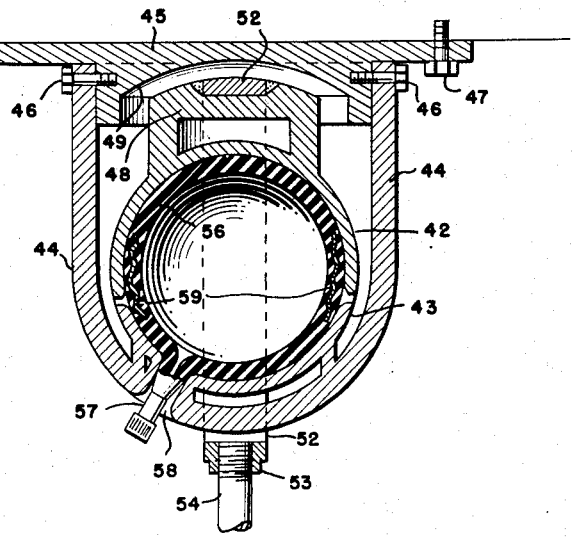
Fig. 5 is a sectional view taken on line 5—5 of Fig. 4.

Figs. 4 and 5 show a modification of the machine mounting element which is arranged to suspend the machine from an overhead supporting structure. In this structure, the receptacles 42 and 43 are identical semi-spherical shells each having a serrated edge consisting of a plurality of regular crenations on its edge which when two such receptacles are placed together will form a sphere having intermeshing projections at the junction thereof. The receptacle 43 is attached to a yoke 44 adapted to be bolted to the stationary fixture 45 by the bolts 46. The stationary fixture 45 is attached to the supporting structure by the bolts 47. The receptacle 42 is provided with a buttress 48, a surface which is a portion of a sphere, which surface is normally held clear of the surface 49 of the stationary fixture except when the unit is subjected to shock loading. The yoke 52 is secured to the buttress 48 and is provided with the threaded shoulder 53 adapted to receive the rod 54 attached to the machine. A bladder 56 is provided which fits the cavity between the two receptacles 42 and 43, and has a stem 57 passing through the hole 58 in the yoke 44. The function and construction of the bladder 56 is similar to that previously discussed and the reinforcing strip 59 is included in the bladder 56 adjacent the junction of the shells 42 and 43.

The spherical element allows free movement in any direction within safe limits and in addition, allows a limited rotation of the rod about the mounting element in any direction. The rotation of the element is limited by the vertical clearance between the serrated edges such as the crenations in the receptacles, while lateral movement is limited by the lateral clearances of the convolutions and upward movement of the rod 54 is limited by the clearance between the buttress 48 and the surface 49 in the stationary fixture 45.

Fig. 6 shows a spherical shock mounting similar to that shown in Figs. 4 and 5 arranged to be located beneath the machine. The receptacles 60 and 61 are similar to the receptacles 42 and 43 except that they are provided with circular threaded flanges 64, 65 perpendicular to the axis of symmetry of the receptacle. The outer edge of the flange is threaded to operatively engage the threaded collar 66 of the retaining cup 67. The retaining cup 67 is a metallic tube having a threaded collar 66 of reduced diameter at one end of the tube and a shoulder 68 of an inside diameter substantially smaller than the diameter of the circular flanges so as to present substantial contact surface therebetween to prevent excessive separation of the receptacles. The mounting plates 70, 71 are attached to the receptacles perpendicular to the axis thereof and plate 70 is of such a diameter as to pass freely through the shoulder when the unit is assembled as described hereinafter.

The mounting plate may be secured to the machine bed or the foundation by any convenient means, such as bolting.

Each of the receptacles 60, 61 is provided with an opening 72 in the wall between the threaded flange and the attachment of the mounting plate suitable for the passage of the stem 74 of the bladder. The bladder is molded to fit snugly within the cavity formed by the two receptacles when assembled and is provided with a reinforcing strip molded therein around its horizontal diameter to prevent the bladder from being forced into the clearance spaces of the serrated edges between the receptacles, as in the modifications previously discussed.

The element 75 is assembled by screwing the retaining cup 67 over the threaded flange 64 of the receptacle 60 so that the flange is within the retaining cup. When the bladder has been inserted and the machine placed on the mount, the retaining cup 67 is screwed onto the flange 65 of the mating receptacle 61.

Figs. 7 and 8 show a further modification of the present invention. The upper support member 83 is provided with a mounting plate 88 adapted to be attached to the bed of the machine and a concave surface 89 having a surface conformation which is a portion of the surface produced by revealing an oblate ellipse about its minor axis. The base support member 84 is provided with a base 90 adapted to be attached to a foundation and contains a concave surface 91 which surface is similar to the surface 89 in the upper support member 83.

The bladder 95 situated in the cavity between the surface 89 and the surface 91 is molded in a spherical form and is provided with a reinforcement 96 which prevents the expansion of the bladder but allows free flexing thereof. The bladder 95 is equipped with an inflating stem 97 which passes through an opening in the bottom support member 84 and is provided with a fixture 98 for attachment of an inflating means.

The upper support member 83 is provided with a horizontal flange 101 and the base support member 84 is provided with a matching flange 102 to protect the bladder 95 and to transmit shock loading. The retaining ring 103 is attached to the flange 102 on the base support member 84 and is provided with a shoulder 105 adapted to engage the upper surface of the flange 101 so as to prevent excessive separation of the flanges 101 and 102. If the upper support member 83 is laterally displaced from the base support member 84, the flange 101 strikes the inner surface of the retaining ring 103 and thus prevents excessive lateral displacement.

It will be apparent to those skilled in the art that many modifications of the present invention are possible. For instance, the dimensions of the mounting units may be varied in proportion to the weight of the machine to be supported and that the unit may be readily modified to suit a particular mounting position if it is desired to do so. The bladder may be composed of either natural or synthetic rubber, and the receptacles and mutual parts may be made from steel or brass as conditions warrant. The individual stems may be extended to terminate at a convenient location by means of tubing.

It will also be appreciated that in the event of the failure of a unit, the remaining units may be inflated sufficiently to allow continued operation if such operation is necessary. While the bladders are protected from excessive pressures by the mating contact surfaces, the machine may be operated for short times even in the event of failure of all the units because the units are self-centering when the flanges are in contact with each other.

The invention described herein may be manufactured and used by or for the Government of the United States of America for governmental purposes without the payment of any royalties thereon or therefor.

What is claimed is:

1. A resilient mounting comprising a first hemispherical shell and a second hemispherical shell having abutting mating edges formed in a plurality of crenations, said first and second shells being positioned in open ended vertical juxtaposition with said crenations intermeshed to form a substantially spherical cavity therebetween, said first shell being positioned below said second shell, a spherical impervious bladder within said spherical cavity, the stationary fixture for attachment to an overhead supporting structure and having a concave limit stop portion therein, said first shell having an integral supporting U-shaped member attached to said stationary fixture, said second shell having an integral buttress protruding therefrom and partially projecting into the concave limit-stop portion of said stationary fixture, bladder reinforcing means adjacent the abutting edges of said first and second shells, and valve means to permit inflation of said bladder to separate said first and second shells, said intermeshed crenations and the coaction of the buttress of said second shell with the concave limit-stop portion of said stationary fixture limiting the lateral movement of said second shell relative to said first shell to a predetermined degree.

2. A resilient mounting as defined in claim 1 but further characterized by said crenations being of equal depth and shape.

3. A resilient mounting as claimed in claim 1, but further characterized by the buttress of said second shell having a machine supporting yoke secured thereto and extending downwardly around said first shell and said supporting U-shaped member, a supporting rod secured to said machine supporting yoke, whereby a machine may be resiliently mounted to said overhead supporting structure.

JAMES A. McNALLY.

No references cited.